United States Patent [19]

Siegler

[11] Patent Number: 5,027,758
[45] Date of Patent: Jul. 2, 1991

[54] FUEL SYSTEM FOR CRANKCASE SCAVENGED TWO CYCLE SPARK IGNITION ENGINES

[76] Inventor: Frederick Siegler, 444 S. Citrus Ave., Los Angeles, Calif. 90036

[21] Appl. No.: 549,812

[22] Filed: Jul. 9, 1990

[51] Int. Cl.⁵ .......................................... F02B 33/04
[52] U.S. Cl. ............................. 123/73 AD; 123/527
[58] Field of Search ............. 123/527, 65 A, 65 WA, 123/73 AD

[56] References Cited

U.S. PATENT DOCUMENTS

| | | | |
|---|---|---|---|
| 2,724,372 | 11/1955 | Schowalter | 123/65 A |
| 3,062,198 | 1/1965 | Richardson | 123/65 A |
| 3,425,399 | 2/1969 | Ward et al. | 123/65 A |
| 3,817,227 | 6/1974 | Onishi | 123/65 WA |
| 4,098,248 | 7/1978 | Todd | 123/527 |
| 4,317,432 | 3/1982 | Noguchi et al. | 123/65 A |
| 4,369,751 | 1/1983 | Batchelor et al. | 123/527 |
| 4,503,812 | 3/1985 | Eberhardt | 123/527 |

Primary Examiner—E. Rollins Cross
Attorney, Agent, or Firm—Thomas I. Rozsa

[57] ABSTRACT

A fuel system for crankcase scavenged two cycle spark ignition engines which includes a specialized valve assembly connecting a source of propane gas and a source of oil to the engine. An automatic main valve connects the source of gas to the engine port and also senses pulses from the engine crankcase. A control valve interconnected to a venturi controls the air and oil supply to the engine.

11 Claims, 1 Drawing Sheet

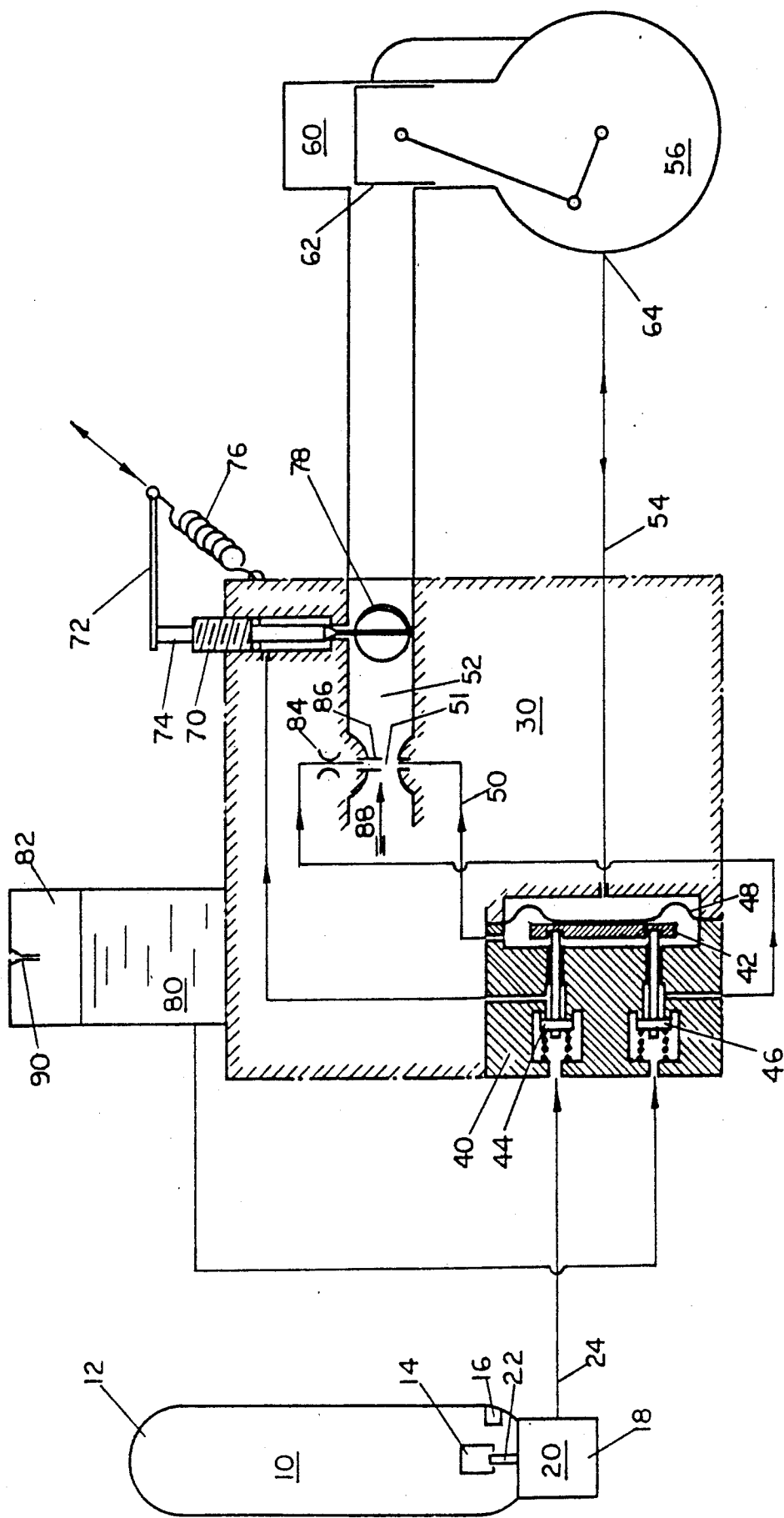

FUEL SYSTEM FOR CRANKCASE SCAVENGED TWO CYCLE SPARK IGNITION ENGINES

BACKGROUND OF THE INVENTION

1. Field of the Invention

The present invention relates to the fuel system of small two cycle crankcase scavenged spark ignition engines typically used for yard blowers and trimmers and similar equipment, to operate on LPG (liquified petroleum gas) such as propane, to eliminate air pollution, fuel mixing and providing single step starting, making these engines more user friendly. The present invention further relates to the substitution of a novel fuel system and carburetor assembly to replace the gasoline fuel tank and gas line conventionally used with such two cycle crankcase scavenged spark ignition engines.

2. Description of the Prior Art

A conventional two stroke engine is provided with a scavenging fan. At the start of the first stroke, the piston is in its highest position. When the compressed petrol-and-air over the piston is ignited, the latter is thrust downwards and, in so doing, releases the exhaust port. The burned gases in the cylinder, which are still under high pressure, can thus escape through this port. When the piston descends further, its upper edge releases the inlet port, which admits fresh petrol-and-air mixtures, delivered by a fan, into the cylinder, so that the remaining burned gases are flushed out. When the piston rises again on the second stroke, all the ports are closed off for a time, and during this period the petrol-and-air mixture is compressed, so that a fresh cycle can commence.

The crankcase-scavenged two-stroke engine has no scavenging fan. Instead, the crankcase is hermetically sealed, so that it can function as a pump in conjunction with the piston. When the piston ascends, a partial vacuum is produced in the crankcase, until the lower edge of the piston releases the inlet port and thus opens the way to the fresh petrol-and-air mixture into the crankcase. When the piston descends, the mixture in the crankcase is compressed a little so that, as soon as the top of the piston releases the transfer port and overflow duct which connects the crankcase to the cylinder, it can enter the cylinder. Meanwhile, what happens above the piston is the same as in the fan scavenged engine. The lubricating oil is mixed with the petrol or is, alternatively, supplied to the points of lubrication dropwise by small lubricating oil pumps. The oil which enters the crankcase is liable to be carried through the overflow duct and transfer port into the cylinder, where it passes through the exhaust port and into the exhaust system.

The two cycle crankcase scavenged spark ignition engines known as two cycle SI engines are predominantly used to power hand tools made for the garden industry and to a lesser extent for the construction and building industry. The power rating of these engines are from a few tenth of a horsepower to several horsepower. The two cycle SI engines dominate this field because they provide mobility at a light weight and a reasonable initial cost.

The fuel for these engines is a mixture of gasoline and lubricating oil in a predetermined ratio which must be mixed by the user. This is an unpleasant chore for the consumer, often resulting in improper mixture ratio. The fuel mixture provides fuel for the combustion process and the oil contained in it provides lubrication for the engine components. Because of the two cycle operating principle, part of the incoming mixture is discharged through the exhaust port as part of the scavenging process, leaving unburned hydrocarbons in the exhaust. Furthermore, much of the lubricating oil burns and contributes to smoke and unfavorable exhaust emission and odor.

The fuel system consists of a fuel tank attached to the engine and connected to a gasoline carburetor which is typically a membrane carburetor as manufactured by Walbro Co., Tillotson and several domestic and foreign manufacturers. This is a precision device consisting at least of thirty components and several minute holes. The engine crankcase pressure pulses are used to operate a small pulse pump to feed a metering chamber which dispenses fuel into the carburetor venturi as a function of air flow and throttle position. Providing starting fuel at cranking speed and controlling fuel at peak power is a considerable task which explains the need for complexity and required precision of this type of carburetor. As a consequence, the cost of the carburetor is high and is a considerable part of the total engine cost. Furthermore, it is one of the weak points of engine reliability and cause of hard starting. Starting of these engines is accomplished with a rope starter which has a spring rewind pulley and a ratchet that engages the crankshaft through pawls. When the engine starts, the pawls disengage due to the centrifugal force acting on them. The starting procedure involves several steps which must be performed in sequence. If it is done incorrectly, the engine will not start which is the most frequent consumer complaint. The typical starting sequence requires: to turn on the ignition, to close the choke, set the throttle to a starting position, briskly pull on the starter until the first pop is heard, readjust or open the choke, briskly pull on the starter until the engine starts, warm up the engine before loading. Starting a warm engine has its own problems such as vapor lock because of heat soak. There are also variations on the above procedure such as hand priming prior to starting.

Therefore, there is a significant need for an improved fuel system which operates on cleaner burning fuel such as liquid propane and which eliminates or significantly reduces the problems addressed above.

SUMMARY OF THE INVENTION

The present invention relates to an improved fuel system and assembly which replaces the conventional gasoline fuel system in crankcase scavenged two cycle engines.

The present invention relates to a novel approach to resolve air pollution problems, to eliminate fuel mixture preparation, to simplify the starting procedure, to make these engines user-friendly and more acceptable for the consumer market with particular attention paid to the environment.

The fuel system is retrofit with minor external modifications to the engine structure, such as replacing the gasoline fuel tank with an adapter to support an LPG propane bottle.

To resolve the exhaust emission problem, LPG propane was selected which is commercially available from any hardware store in 14.1 or 16.4 oz. capacities.

Propane is used as a fuel on large engines such as fork lifts so that they can operate indoors without poisoning the atmosphere. Large engines are typically for cycle SI engines which have a separate fuel system and a separate lubrication system.

It has been discovered, according to the present invention, that if liquid propane is used instead of gasoline to burn in crankcase-scavenged two cycle engines, then the engine will burn much cleaner.

It has further been discovered, according to the present invention, that if the carburetor is modified to comprise specialized valves and an oil reservoir to efficiently combine the propane fuel and oil, then the user will not need to separately mix the fuel and oil.

It is therefore an object of the present invention to provide an efficient and clean burning crankcase scavenged two cycle engine.

It is an additional object of the present invention to provide such a crankcase scavenged two cycle engine which is run by liquid propane gas and not gasoline.

It is a further object of the present invention to provide a crankcase scavenged two cycle engine which has automatic valves and an oil supply reservoir which can be combined with the propane gas to provide an efficient system for feeding the oil and fuel to the crankcase and cylinder of the two cycle engine without the requirement for the user to separately mix the fuel and oil.

Further novel features and other objects of the present invention will become apparent from the following detailed description, discussion and the appended claim, taken in conjunction with the drawings.

BRIEF DESCRIPTION OF THE DRAWINGS

Referring particularly to the drawings for the purpose of illustration only and not limitation, there is illustrated:

The FIGURE is a schematic diagram of the present invention fuel system for crankcase scavenged two cycle spark ignition engines.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

The FIGURE is a schematic diagram of the present invention fuel system for crankcase scavenged two cycle spark ignition engines. The source of fuel is liquid propane gas 10 which is housed inside a liquid propane gas bottle 12. By way of example, the liquid propane gas bottle 12 may be a Standard 14.1 or 16.4 oz. LPG propane bottle with a standard threaded adapter, built-in check valve and pressure relief valve as per DOT-39NRC 228/286. The built in check valve is illustrated at 14 and the pressure relieve valve is illustrated at 16.

A standard pressure reducing and regulating valve 20 such as sold by the Coleman Co., is mounted to a metal part of the engine such as the fan housing to support one end 18 of the LPG propane bottle 12 and to warm the propane gas with engine heat as it tends to cool when its pressure is reduced. When the LPG bottle 12 is attached to the engine, its internal check valve 14 is opened by the regulator valve prong 22 and permits the propane gas 10 to enter the regulator valve 20 which reduces the bottle pressure to system pressure and maintains this pressure regardless of flow.

A conduit or gas line 24 with proper fittings to connect the pressure reducing and regulating valve with the carburetor body 30. The carburetor 30 may be connected to the engine cylinder 60 with a thin gasket to assure maximum heat transfer to the carburetor 30.

An automatic main valve 40 is down-stream from the pressure regulating valve 20 and it is housed in the carburetor body 30 which is attached directly to the intake port 62 of the cylinder 60 and in connection with the pulse port 64 of the crankcase 56. The automatic main valve 40 is a double valve with a single actuator 42, normally closed by spring load for initial seating and by the gas system pressure and oil head. The main valve 40 has a gas valve 44 and an oil valve 46. The main valve 40 prevents gas from entering the carburetor when the engine is not running and when the LPG bottle is attached to the engine. It also prevents oil from draining when the engine is stored. The automatic main valve 40 is normally closed by the system pressure and spring load. The automatic main valve 40 also has means to sense the engine rotation to thereby open due to crankcase pulse or venturi vacuum or the combination of the two. When the rope starter is activated and the engine is turned over, vacuum 50 is generated in the carburetor venture 52 and pressure pulses 54 in the crankcase 56. A diaphragm actuator 48 senses the pressure differential between the carburetor venture 52 and the crankcase pulses 54 which, in turn, acts on the gas valve 44 and cracks it open, permitting gas 10 to enter carburetor 30. When the engine starts, the carburetor venture vacuum 50 becomes predominant and keeps the main valve 40 open while the engine runs. When the engine is stopped by cutting out the ignition, the main valve 40 automatically closes and prevents the gas 10 or oil 80 from entering the carburetor 30.

The control valve 70 is down-stream from the automatic main valve 40. This is a needle valve rotatably seated in the carburetor body 30. Its function is to control the gas flow to the engine cylinder 60 by closing or opening. This is accomplished by a spring biased arm 72 attached to the control valve stem 74. The spring 76 tends to close the valve 70 and is acting against a manual control force typically generated by a finger trigger mechanism to open the valve 70 to increase speed. The preferred orientation of the needle valve is on center with the venture 50 and perpendicular to its axis. It can thereby control both air and gas flow. To the extension of the small end of the needle valve, a butterfly valve 78 may be attached to control air/fuel ratio and also to facilitate the mixing of air, gas and oil in the venturi prior to entering the engine. Test engines operated satisfactorily without the butterfly valve 78 where air/fuel ratio was controlled by venturi throat size and control valve opening.

Oil 80 is housed in an oil reservoir 82. Oil flow to the engine is controlled by a properly sized orifice 84 which is down-stream from an automatic main valve 40 and its oil valve 46. The differential pressure between the oil reservoir 82 and the venturi vacuum 50 forces the oil 80 into the venturi throat 51. The form of oil discharge can be controlled by the oil exit hole to the venturi. A protruding tube 86 into the air stream 88 provides atomization of the oil 80. Elimination of the discharge tube 86 permits the oil 80 to ooze out of the hole and forced to the engine port 62 on the venturi wall by the air motion.

A proper compromise between these two limits can minimize suspended oil in the air to leave the engine during the scavenging period. For lubrication, approximately 7cc. oil is needed per 14.1 oz. propane. The oil reservoir 82 must be transparent so that the oil level can be observed. It may be attached to the carburetor or it may be remotely mounted depending from the installation. The oil reservoir 82 is equipped with a rubber check valve 90 permitting air to enter and preventing oil to spill. The gravity feed arrangement is the most cost-effective and sufficient for string trimmer and blower installation. This does not exclude a more sophisticated system such as an all position metering pump. The gravity fed oil supply 82 also may include means to automatically shut off when the engine control is deactivated. This prevents oil from draining into the engine when stored. Gravity discharge is increased by the throat vacuum when the engine is running because of the pressure differential between the atmosphere and the carburetor throat.

To start the engine, the ignition must be ON. This is normally the case when a momentary kill switch is used. The LPG propane bottle 12 is attached to the engine which automatically activates the pressure regulator 20. The throttle trigger is placed into the start position which opens the control valve 70 for the starting gas requirement to the engine. When the starter rope is activated, the automatic main valve 40 opens as described earlier and provides gas 10 and oil 80 to the venture 52. When the engine starts and sustain operation, the throttle trigger can be released which will take up the idle position. After warm up, the engine is controlled by the throttle trigger to match the power demand. The engine is stopped by the customary ignition kill switch.

In accordance with propane fueled consumer products such as stoves and torches, it is recommended to remove the LPG propane bottle 12 from the engine to prevent leakage in case of a faulty valve. Assuming that the bottle will not be removed despite the operating instruction, it may be prudent to incorporate a shut-off feature into the pressure regulator 20 and eliminate the ignition kill switch so that the operator is forced to shut off the engine by cutting off the fuel supply. Naturally, the ignition kill switch may be retained at a very small cost penalty.

The operating time on a standard 14.1 oz. propane bottle is a function of load and fuel consumption which varies from engine to engine. A calculated spread of 45 minutes to 60 minutes was found which corresponds to a typical one-month consumer use of blowers or trimmers. A back pack LPG propane bottle in combination with a hand-held blower would provide more than adequate fuel supply for a professional gardener for several days.

The cost of the LPG propane bottle is relatively high compared to gasoline. This is because of the cost of the disposable bottle which costs more than the propane in it. The economic consideration greatly improves when a bottle exchange program is considered either by the equipment manufacturer or the gas supplier.

The LPG fuel system as described above provides a user-friendly engine and environmentally acceptable tool at a reasonable cost penalty to the user and considerable opportunity to the fuel supplier.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A fuel system for a crankcase scavenged two cycle spark ignition engine having a pulse port to its crankcase and an intake port for a cylinder of the engine, comprising:
   a. a liquid propane gas bottle containing therein liquid propane gas, and including a built in check valve and pressure relief valve;
   b. a pressure reducing and regulating valve attached to the liquid propane gas bottle;
   c. a carburetor housing an automatic main valve comprised of a gas valve and an oil valve both operated by actuator means and also housing a venture and a needle control valve interconnected to the venture;
   d. a gas line connecting the pressure reducing and regulating valve to said gas valve;
   e. an oil reservoir containing oil and connected to said oil valve;
   f. said oil valve connected through an orifice to said venture;
   g. said gas valve connected through an orifice to said venture;
   h. said automatic main valve connected to the pulse port of the engine crankcase and also connected to the intake port of the engine cylinder through connection to the venturi; and
   i. spring actuated means for opening and closing the control valve.

2. The fuel system in accordance with claim 1 wherein said carburetor body is directly attached to the engine cylinder with a thin gasket to assure maximum heat transfer to the carburetor.

3. The fuel system in accordance with claim 1 wherein said oil reservoir is gravity fed and further comprising means to automatically shut off the oil supply when the engine control is deactivated.

4. The fuel system in accordance with claim 1 wherein a single actuator means actuates both the gas valve and the oil valve.

5. The fuel system in accordance with claim 1 wherein said needle actuated control valve further comprises a butterfly valve intersecting the axle of the venturi and on-center with the venturi thereby controlling both air and gas flow.

6. The fuel system in accordance with claim 1 wherein said automatic main valve further comprises means for sensing engine rotation to open the automatic main valve due to crankcase pulse.

7. The fuel system in accordance with claim 1 wherein said automatic main valve further comprises means for sensing engine rotation to open the automatic main valve due to venture vacuum.

8. The fuel system in accordance with claim 1 wherein said automatic main valve further comprises means for sensing engine rotation to open the automatic main valve due to a combination of crankcase pulse and venturi vacuum.

9. The fuel system in accordance with claim 1 further comprising tube means leading from the oil orifice to the venture thereby favoring oil discharge to the venturi wall and limiting suspended oil from the venturi air stream to thereby limit oil discharge to the atmosphere during scavenging.

10. The fuel system in accordance with claim 1 wherein said oil reservoir is gravity fed and further comprising means to automatically shut off the oil and gas supply when the engine control is deactivated.

11. The fuel system in accordance with claim 1 wherein the automatic main valve is normally closed by the system pressure and the load from the spring actuated means downstream and in-line with the pressure regulator.

* * * * *

UNITED STATES PATENT AND TRADEMARK OFFICE
CERTIFICATE OF CORRECTION

PATENT NO.   : 5,027,758

DATED        : July 2, 1991

INVENTOR(S)  : Frederick Siegler

It is certified that error appears in the above-identified patent and that said Letters Patent is hereby corrected as shown below:

Col. 2, line 68: Change the word "for" to "four".
    Col. 4, line 28, Change "venture" to read "venturi".
           line 30, Change "venture" to read "venturi".
           line 49, Change "venture" to read "venturi".

Col. 5, line 30, Change "venture" to read "venturi".

Col. 6, line 28, Change "venture" to read "venturi".
           line 29-30, Change "venture" to read "venturi".
           line 36, Change "venture" to read "venturi".
           line 38, Change "venture" to read "valve".
           line 68, Change "venture" to read "venturi".

Col. 7, line 11, Change "venture" to read "venturi".

Signed and Sealed this

Eighteenth Day of May, 1993

MICHAEL K. KIRK

Attest:

Attesting Officer

Acting Commissioner of Patents and Trademarks